US012586915B2

(12) United States Patent
Monedero Miranda et al.

(10) Patent No.: US 12,586,915 B2
(45) Date of Patent: Mar. 24, 2026

(54) ANTENNA ASSEMBLY WITH METALLIZED CAVITY WAVEGUIDE

(71) Applicant: NXP B.V., Eindhoven (NL)

(72) Inventors: Manuel Alfredo Monedero Miranda, Munich (DE); Vishwadeep Nikhil Sharma Suryanarayana, Munich (DE)

(73) Assignee: NXP B.V., Eindhoven (NL)

( * ) Notice: Subject to any disclaimer, the term of this patent is extended or adjusted under 35 U.S.C. 154(b) by 58 days.

(21) Appl. No.: 18/809,131

(22) Filed: Aug. 19, 2024

(65) Prior Publication Data

US 2026/0051660 A1 Feb. 19, 2026

(51) Int. Cl.
*H01Q 13/18* (2006.01)
*H01Q 21/00* (2006.01)
*H01Q 21/06* (2006.01)

(52) U.S. Cl.
CPC ......... *H01Q 13/18* (2013.01); *H01Q 21/0043* (2013.01); *H01Q 21/064* (2013.01)

(58) Field of Classification Search
CPC ........ H01Q 13/10–206; H01Q 21/0043–0062; H01Q 21/064
See application file for complete search history.

(56) References Cited

U.S. PATENT DOCUMENTS 5,194,876 A * 3/1993 Schnetzer .............. H01Q 21/30 343/769
5,754,143 A * 5/1998 Warnagiris ............... H01Q 9/14 343/895
6,034,645 A * 3/2000 Legay ....................... H01Q 5/40 343/769
10,490,906 B2 * 11/2019 Xu ........................ G02B 6/1225
2010/0238085 A1 9/2010 Fuh et al.
2013/0120206 A1 * 5/2013 Biancotto ............ H01Q 21/005 29/600

(Continued)

FOREIGN PATENT DOCUMENTS

JP 6473803 A 3/1989
JP 2018182422 A 11/2018

OTHER PUBLICATIONS

Hammu-Mohamed et al.; SIW Cavity-Backed Antenna Array Based on Double Slots for mmWave Communications; Appl. Sci. 2021, 11, 4824; May 24, 2021; (Year: 2021).*

(Continued)

*Primary Examiner* — Ab Salam Alkassim, Jr.
(74) *Attorney, Agent, or Firm* — Andrew C. Milhollin

(57) ABSTRACT

The present disclosure relates an antenna assembly that includes an antenna structure and a substrate. The antenna structure may be formed from a single contiguous piece of metal. The antenna structure may include at least one slot antenna formed in the single contiguous piece of metal. The substrate may include at least one dielectric layer, and a waveguide comprising a metallized cavity that extends through the at least one dielectric layer. The antenna structure may be attached to the substrate, may be disposed at an upper surface of the substrate, and may cover the metallized cavity of the waveguide. The substrate may be a printed circuit board (PCB) substrate, an in-mold electronics (IME) substrate, a molded interconnect device (MID) substrate, or another suitable substrate.

18 Claims, 11 Drawing Sheets

(56) References Cited

U.S. PATENT DOCUMENTS

| | | | | |
|---|---|---|---|---|
| 2014/0015725 | A1* | 1/2014 | Enders | H01Q 3/26<br>343/771 |
| 2015/0229027 | A1* | 8/2015 | Sonozaki | H01Q 21/005<br>343/771 |
| 2016/0056541 | A1* | 2/2016 | Tageman | H01P 3/16<br>343/858 |
| 2016/0126637 | A1* | 5/2016 | Uemichi | H01Q 21/0043<br>343/771 |
| 2017/0244173 | A1* | 8/2017 | Moon | H01Q 13/106 |
| 2018/0301820 | A1* | 10/2018 | Bregman | H01P 3/123 |
| 2019/0058260 | A1* | 2/2019 | Kirino | H01Q 21/064 |
| 2019/0067830 | A1* | 2/2019 | Xu | G02F 1/065 |
| 2020/0153108 | A1* | 5/2020 | Uemichi | H01Q 13/106 |
| 2020/0287277 | A1* | 9/2020 | Wang | H01Q 9/27 |
| 2021/0013621 | A1* | 1/2021 | Nakamoto | H01Q 21/0062 |
| 2021/0028549 | A1* | 1/2021 | Doyle | H01Q 21/005 |
| 2021/0210865 | A1 | 7/2021 | Li et al. | |
| 2021/0249777 | A1* | 8/2021 | Alexanian | H01Q 1/3233 |
| 2022/0200115 | A1* | 6/2022 | Li | H01Q 1/3233 |
| 2022/0200160 | A1* | 6/2022 | Li | H01Q 21/0043 |
| 2022/0209423 | A1* | 6/2022 | Goebel | H01Q 13/18 |
| 2022/0231408 | A1* | 7/2022 | Carluccio | H01Q 13/06 |
| 2023/0223701 | A1* | 7/2023 | Chan | H01Q 13/06<br>343/767 |
| 2023/0261386 | A1* | 8/2023 | Lee | H01Q 21/005<br>343/702 |
| 2023/0307814 | A1* | 9/2023 | Alexanian | H01Q 21/0043 |
| 2023/0327330 | A1* | 10/2023 | Li | H01Q 21/0043<br>343/711 |
| 2023/0378653 | A1* | 11/2023 | Mizuno | H01Q 23/00 |
| 2023/0420857 | A1 | 12/2023 | Garcia Tejero et al. | |
| 2024/0125913 | A1 | 4/2024 | Luo et al. | |
| 2025/0300352 | A1* | 9/2025 | Heimrath | H01L 23/66 |

OTHER PUBLICATIONS https://abracon.com/onboard-stamped-metal-antennas.

https://lynwave.com/product/dual-band-2-4-5ghz-metal-pifa-antenna-ipex-mhf4-for-wi-fi/.

https://www.multi-circuit-boards.eu/en/pcb-design-aid/drills-throughplating/press-fit-technology.html.

https://www.rocket-pcb.com/rocket-pcb-on-cavity-pcb-board-for-wholesale.

Eray Topak et al: "A Novel Millimeter-Wave Dual-Fed Phased Array for Beam Steering", IEEE Transactions on Microwave Theory and Techniques, IEEE, USA, vol. 61, No. 8, Aug. 1, 2013, pp. 3140-3147.

Jixin Chen et al: "Development of a single board microwave sub-system based on substrate integrated waveguide (SIW) technology", Microwave Symposium Digest (MTT), 2012 IEEE MTT-S International, IEEE, Jun. 17, 2012, pp. 1-3.

* cited by examiner

ANTENNA ASSEMBLY WITH METALLIZED CAVITY WAVEGUIDE

TECHNICAL FIELD

Embodiments of the subject matter described herein relate generally to antenna assemblies, including antenna assemblies having waveguides formed from one or more metallized cavities in a substrate.

BACKGROUND

The use of millimeter-wave (mm-wave) frequencies in communication devices and radar applications, such as automotive radar applications, is continuously expanding. Antennas are critical components in all these fields, and come with advanced requirements in terms of performance, size, weight and compliance to environmental standards. At mm-wave frequencies, the RF-performance of a given communication system or radar system is no longer determined only by the transceiver circuits and the antenna, but also strongly depends on the package and the interconnection between the transceiver and the antenna. Such interconnection can include a combination of one or more conductive traces, waveguides, ball grid arrays, or other coupling structures.

BRIEF DESCRIPTION OF DRAWINGS

A more complete understanding of the subject matter may be derived by referring to the detailed description and claims when considered in conjunction with the following figures, wherein like reference numbers refer to similar elements throughout the figures. Elements in the figures are illustrated for simplicity and clarity and have not necessarily been drawn to scale. The figures along with the detailed description are incorporated and form part of the specification and serve to further illustrate examples, embodiments and the like, and explain various principles and advantages, in accordance with the present disclosure, wherein:

DETAILED DESCRIPTION

Figure 1:
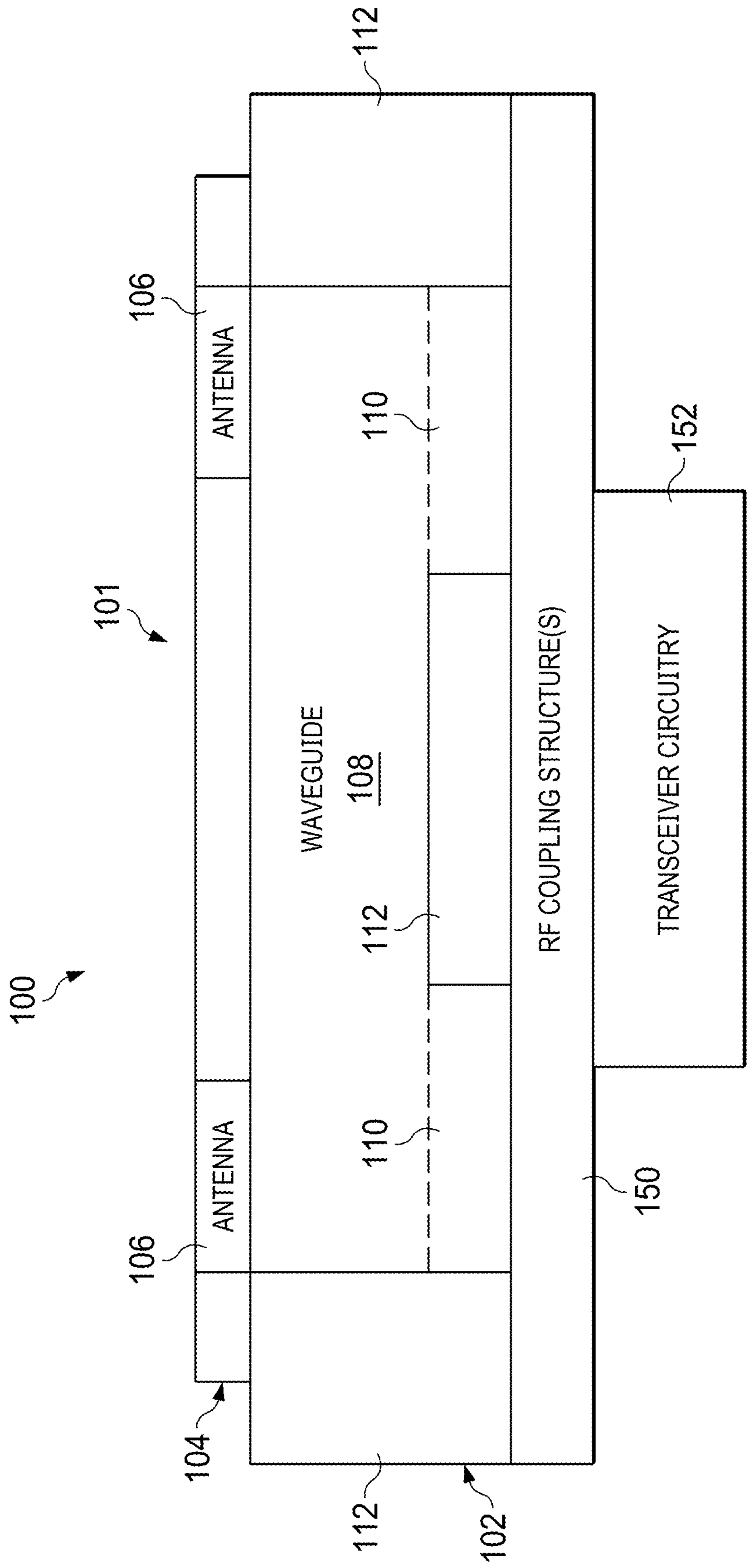
FIG. 1 shows a cross-sectional side view of an illustrative RF device that includes an antenna assembly, in accordance with various embodiments.

The following detailed description is merely illustrative in nature and is not intended to limit the embodiments described herein and uses of such embodiments. Furthermore, there is no intention to be bound by any expressed or implied theory presented in the preceding technical field, background, or the following detailed description.

For simplicity and clarity of illustration, the figures illustrate the general manner of construction. Descriptions and details of well-known features and techniques may be omitted from the following detailed description to avoid unnecessarily obscuring the present disclosure. For example, the dimensions of some of the elements or regions in the figures may be exaggerated relative to other elements or regions to help improve understanding of embodiments described herein.

The terms "first," "second," "third," "fourth" and the like in the description and the claims, if any, may be used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "comprise," "include," "have" and any variations thereof, are intended to cover non-exclusive inclusions, such that a process, method, article, or apparatus that comprises a list of elements is not necessarily limited to those elements but may include other elements not expressly listed or inherent to such process, method, article, or apparatus. As used herein the terms "approximate," "approximately," "substantial" and "substantially" mean sufficient to accomplish the stated purpose in a practical manner and that minor imperfections, if any, are not significant for the stated purpose.

Along these lines, when used with references to measurable quantities including, but not limited to, dimensions, these terms mean that the quantities are equal to the values stated subject to accepted tolerances of any methods or apparatus chosen to fabricate the described structures or measure the quantities or dimensions described. Directional references such as "top," "bottom," "left," "right," "above," "below," and so forth, unless otherwise stated, are not intended to require any preferred orientation and are made with reference to the orientation of the corresponding figure or figures for purposes of illustration. As used herein, the words "exemplary" and "example" mean "serving as an example, instance, or illustration." Any implementation described herein as exemplary or an example is not necessarily to be construed as preferred or advantageous over other implementations. In addition, certain terms may also be used herein for reference only, and thus are not intended to be limiting.

Herein, elements or nodes or features are sometimes referred to as being "connected" or "coupled" together. As used herein, unless expressly stated otherwise, "connected" means that one element is directly joined to (or directly communicates with) another element in an electrical or non-electrical manner, and not necessarily mechanically. Likewise, unless expressly stated otherwise, "coupled" means that one element is directly or indirectly joined to (or directly or indirectly communicates with) another element in an electrical or non-electrical manner, and not necessarily mechanically. Thus, although the schematic illustrations shown in the figures depict exemplary arrangements of elements, additional intervening elements, devices, features, or components may be present in one or more embodiments of the depicted subject matter.

Various embodiments described herein relate to antennas and waveguide structures, which may be included as part of a package for a radio frequency (RF) device. Such an RF device may include transceiver circuitry for radar systems (e.g., automotive radar systems) or wireless communications systems. The antennas and waveguide structure may be part of an antenna assembly. The antenna assembly may include a metallized substrate, such as a printed circuit board (PCB), where a metallized cavity formed in the substrate forms the waveguide, and the antennas are formed in an antenna structure that is attached to the substrate (e.g., at a top surface of the PCB) overlapping the waveguide.

Some conventional antenna assemblies typically include antenna structures that are formed from a planar metal layer of the PCB, and require separate waveguide structures, which undesirably increase the height of the antenna assembly, and which undesirably increase losses (e.g., signal losses) because of higher dielectric losses attributable to the thicker substrate. Other conventional antenna assemblies require an RF-specific substrate (e.g., soft RF substrates, such as substrates formed from polytetrafluoroethylene (PTFE) or polyimide substrates, or hard RF substrates, such as alumina, glass, or semiconductor substrates), which undesirably results in comparatively higher design and manufacturing costs.

Embodiments herein address these challenges by providing an antenna assembly that includes a PCB (or another suitable printed circuit substrate, such as a Molded Interconnect Device (MID) substrate, a 3D printed substrate or an in-mold electronics (IME) substrate, as non-limiting examples) and a separate antenna structure attached to the PCB, where a metallized cavity is formed in one or more layers of the PCB and acts as a waveguide for the separate antenna structure, and the separate antenna structure overlaps (e.g., covers) the metallized cavity corresponding to the waveguide. By using a metallized cavity of the PCB as the waveguide, the height of the overall device package may be advantageously reduced compared to conventional PCB-based antenna assemblies. Because the antenna structure may be attached to the PCB via soldering or mechanical fastening, the complexity of manufacturing the antenna assembly may be advantageously reduced. The antenna assembly may have advantageously reduced weight compared to conventional antenna assemblies that are formed entirely from metal. Utilization of PCB substrates in the antenna assembly may result in advantageously reduced manufacturing costs and reduced design complexity, compared to conventional antenna assemblies that use RF-specific substrates. In one or more embodiments, thermal expansion of the antenna structure may be matched to that of the substrate of the antenna assembly, such that the antenna assembly experiences less thermal stress during operation, compared to conventional antenna assemblies that use RF-specific substrates. The use of a PCB in the antenna assembly may result in improved manufacturing tolerances and better isolation between channels, compared to conventional antenna assemblies that use RF-specific substrates.

In one or more embodiments, an RF device includes an antenna assembly having PCB and an antenna structure mounted on or otherwise attached to the PCB. In accordance with various embodiments, the antenna structure may be attached to the PCB using one or more press fit structures, solder, solder paste, conductive or non-conductive glue, mechanical fasteners such as screws, or any suitable combination of these, as non-limiting examples. The antenna structure may include one or more slot antennas formed as one or more openings in the antenna structure. The antenna structure may be formed from conductive material, such as metal (e.g., a single contiguous piece of metal). Herein, "conductive" means "electrically conductive" unless otherwise indicated. In one or more embodiments, the antenna structure may include legs that are integrally formed with a central body portion of the antenna structure and that extend away from the central body portion. In one or more embodiments, such legs of the antenna structure may be attached to an upper surface of the PCB via glue, solder, or solder paste, as non-limiting examples. In one or more embodiments, such legs of the antenna structure may be attached to or integrally formed with pins that extend into an upper surface of the PCB.

The PCB may include a metallized cavity that forms a waveguide. The waveguide may extend through one or more layers (e.g., dielectric layers) of the PCB. The waveguide may include one or more waveguide interfaces through which RF signals may be passed between one or more antennas of the antenna structure and transceiver circuitry attached to or otherwise coupled to the PCB. At least a portion (e.g., a portion that is laterally offset from the waveguide interfaces) of the waveguide (i.e., a portion of the corresponding metallized cavity) may not extend completely through the PCB, and may instead only extend partly into one or more layers of the PCB.

In one or more embodiments, the antenna structure overlaps (e.g., directly overlaps and covers) the metallized cavity of the PCB corresponding to the waveguide. In one or more embodiments, the antenna structure completely covers an upper opening of the metallized cavity of the PCB corresponding to the waveguide (here, coverage is considered to include the one or more openings in the antenna structure corresponding to the antennas of the antenna structure). In one or more embodiments, the antenna structure may cover the metallized cavity of the PCB such that an outer perimeter of the surface of the antenna structure that faces the PCB may bound and laterally surround or enclose an outer perimeter of the metallized cavity of the PCB at the upper surface of the PCB. In one or more embodiments, the one or more antennas of the antenna structure directly vertically overlap one or more respective waveguide interfaces of the waveguide. In one or more other embodiment, the antennas of the antenna structure do not vertically overlap any waveguide interfaces of the waveguide.

FIG. 1 shows a cross-sectional side-view of an illustrative radio frequency (RF) device 100. The RF device 100 includes an antenna assembly 101, one or more RF coupling structures 150, and transceiver circuitry 152. The antenna assembly 101 includes a printed circuit board (PCB) 102 (sometimes referred to herein as the "printed circuit board substrate 102" or the "PCB substrate 102") and an antenna structure 104. In one or more embodiments, the antenna structure 104 includes antenna elements 106. The antenna structure 104 may be formed from a single, contiguous piece of electrically conductive material (e.g., metal or metallized plastic). In one or more embodiments, the antenna elements 106 may be formed as slot antennas (e.g., openings) in the electrically conductive material of the antenna structure 104. In one or more embodiments, the antenna structure 104 may be formed from one or a combination of aluminum, copper, steel, or another suitable electrically conductive material. The antenna structure 104 may be formed as stamped metal, laser-cut metal, or three-dimensional (3D) printed metal, as non-limiting examples.

The PCB 102 includes a waveguide 108. The waveguide 108 may be a metallized cavity (e.g., where surfaces of the PCB 102 defining the cavity are coated in metal) that is formed in one or more layers of dielectric material 112 of the PCB 102. In one or more embodiments, the waveguide 108 may extend completely through the PCB 102 (e.g., extending from a top side or upper surface of the PCB 102 to a bottom side or lower surface of the PCB 102). In one or more embodiments, the waveguide 108 may be laterally surrounded by the dielectric material 112. In one or more embodiments, a portion of the dielectric material 112 may be interposed between a portion of the waveguide 108 and a bottom surface of the PCB 102. The waveguide 108 may include waveguide interfaces 110, through which RF signals may pass between the waveguide 108 and the RF coupling structures 150. In one or more embodiments, either of the waveguide interfaces 110 may be considered "waveguide feeding sources", as signals may be fed into the waveguide (e.g., from the transceiver circuitry 152) through either of the waveguide interfaces 110.

In one or more embodiments, the waveguide interfaces 110 may extend deeper into the PCB 102 than other regions (e.g., non-interface regions) of the waveguide 108, for example. In one or more embodiments, the waveguide interfaces 110 correspond to regions of the waveguide 108 that may extend to a bottom surface (e.g., a lower surface, opposite the upper surface at which the antenna structure 104 is disposed) of the PCB 102. In one or more embodiments, non-interface regions of the waveguide 108 may be formed (e.g., as a metallized cavity) in a first layer of the PCB 102 and the waveguide interfaces 110 may be formed (e.g., as metallized cavities) in a second layer of the PCB 102 (e.g., where the second layer is disposed below the first layer, if considering the antenna structure 104 as being disposed above the PCB 102). In one or more other embodiments, both the non-interface regions of the waveguide 108 and the interfaces 110 may be formed (e.g., as a metallized cavity) in a single layer of the PCB 102. In one or more embodiments, the waveguide interfaces 110 may be disposed directly adjacent to or in direct physical contact with the RF coupling structures 150.

While the waveguide 108 is formed as a metallized cavity in a PCB in the present example, this is intended to be illustrative and non-limiting. For example, in one or more other embodiments, the waveguide 108 may instead be formed as a metallized cavity in a suitable metallized dielectric substrate other than a PCB, such as a Molded Interconnect Device (MID) substrate, a 3D printed substrate or an in-mold electronics (IME) substrate, as non-limiting examples.

The RF coupling structures 150 may be dimensioned and arranged to electrically couple the transceiver circuitry 152 to the waveguide interfaces 110 of the waveguide 108. In one or more embodiments, the transceiver circuitry 152 includes an integrated circuit die that is mounted to the RF coupling structures via flip chip bonding (e.g., ball bonding), wire bonding, or another suitable bonding technique, as non-limiting examples. In one or more embodiments, the RF coupling structures 150 may include separate coupling structures for each of the waveguide interfaces 110. In one or more embodiments, the RF coupling structures 150 may include an interposer structure formed on or attached to a bottom surface of the PCB 102. in one or more other embodiments, the RF coupling structures 150 may be included in the PCB 102 (e.g., may be formed from one or more layers of the PCB 102).

The transceiver circuitry 152 may be configured to generate RF signals to be transmitted via the antenna elements 106 (e.g., in a transmit mode) and may be configured to receive RF signals that are received at the antenna elements 106. In one or more embodiments, the RF coupling structures 150 are arranged to pass RF signals generated by the transceiver circuitry 152 to the antenna elements 106 via the waveguide interfaces 110 and the waveguide 108, such that the RF signals are wirelessly transmitted via the antenna elements 106. In one or more embodiments, RF coupling structures 150 are arranged such that RF signals received at the antenna elements 106 are provided (e.g., routed) to the transceiver circuitry 152 via the waveguide 108, the waveguide interfaces 110, and the RF coupling structures 150.

While the waveguide 108 is shown to include two waveguide interfaces 110 and the antenna structure 104 is shown to include two antenna elements 106 in the present example, it should be understood that this is illustrative and non-limiting. For example, in one or more other embodiments, more or fewer than two antenna elements 106 may be included in the antenna structure 104. For example, in one or more other embodiments, more or fewer than two waveguide interfaces 110 may be included in the waveguide 108.

In one or more embodiments, each of the antenna elements 106 may overlap (e.g., along an axis normal to an upper surface of the antenna structure 104) a corresponding waveguide interface 110. In one or more other embodiments, one or more of the antenna elements 106 may be offset from (e.g., laterally offset from; non-overlapping) the waveguide interfaces 110.

In one or more embodiments, the antenna structure 104 may be mounted on or otherwise attached to the PCB 102, such that the antenna structure 104 is secured in place over and in contact with the PCB 102 (e.g., overlapping and completely or substantially covering the cavity corresponding to the waveguide 108). In one or more embodiments, the antenna structure 104 may cover the metallized cavity of the PCB 102 such that an outer perimeter of the surface of the antenna structure 104 that faces the PCB 102 may bound and laterally surround or enclose an outer perimeter of the metallized cavity of the PCB 102 at the upper surface of the PCB 104. In one or more embodiments, the antenna structure 104 may be attached to the PCB 102 using one or more press fit structures (e.g., pins or tabs) dimensioned to lock or otherwise secure the antenna structure 104 over and in contact with the PCB 102. In one or more other embodiments, the antenna structure 104 may additionally or alternatively be attached to the PCB 102 using solder, solder paste, adhesive (e.g., conductive or non-conductive adhesive, such as conductive or non-conductive glue), fasteners (e.g., metal fasteners such as screws), or any suitable combination thereof, as non-limiting examples.

Because the antenna structure 104 may be attached to the PCB 102 via soldering or mechanical fastening, the complexity of manufacturing the antenna assembly may be advantageously reduced. The antenna assembly 100 may have advantageously reduced weight compared to conventional antenna assemblies that are formed entirely from metal. Utilization of the PCB 102 in the antenna assembly 100 may result in advantageously reduced manufacturing costs and reduced design complexity, compared to conventional antenna assemblies that use RF-specific substrates. In one or more embodiments, thermal expansion of the antenna structure 104 may be matched to that of the PCB 102 of the antenna assembly 100, such that the antenna assembly 100 experiences less thermal stress during operation, compared to conventional antenna assemblies that use RF-specific substrates. The use of the PCB 102 in the antenna assembly 100 may result in improved manufacturing tolerances and better isolation between channels, compared to conventional antenna assemblies that use RF-specific substrates.

Figure 2:
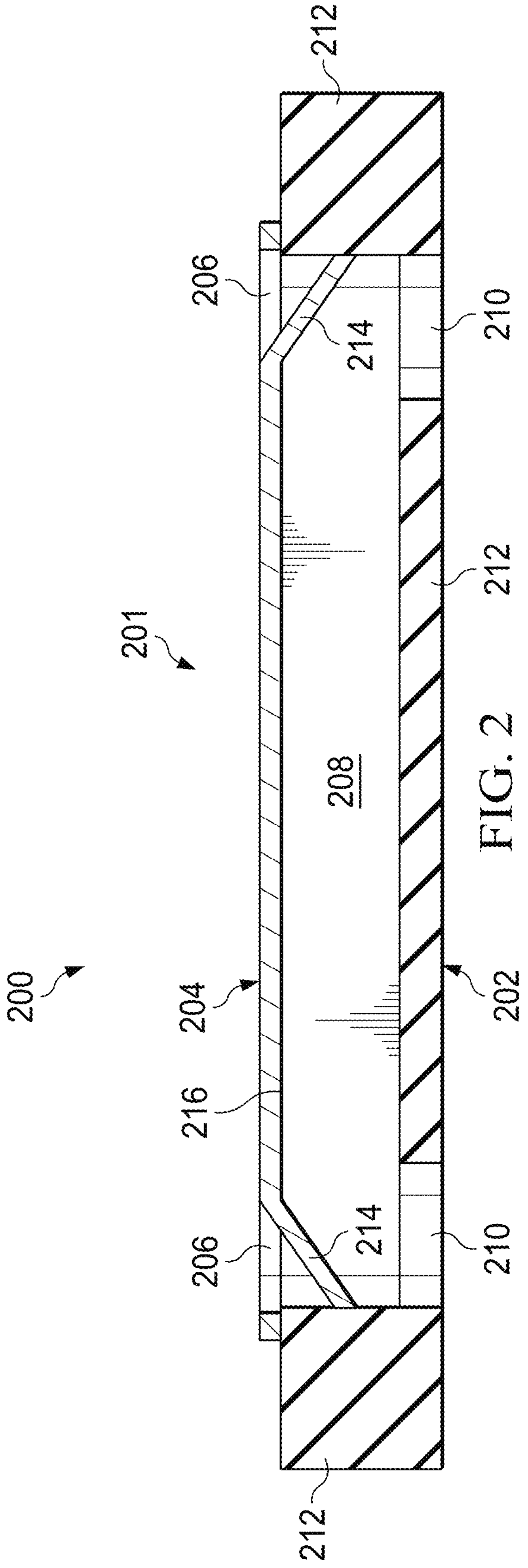
FIG. 2 shows a cross-sectional side view of an illustrative antenna assembly having a substrate in which a waveguide is formed from a metallized cavity and having a separate antenna structure attached to the substrate, in accordance with various embodiments.
Figure 3:
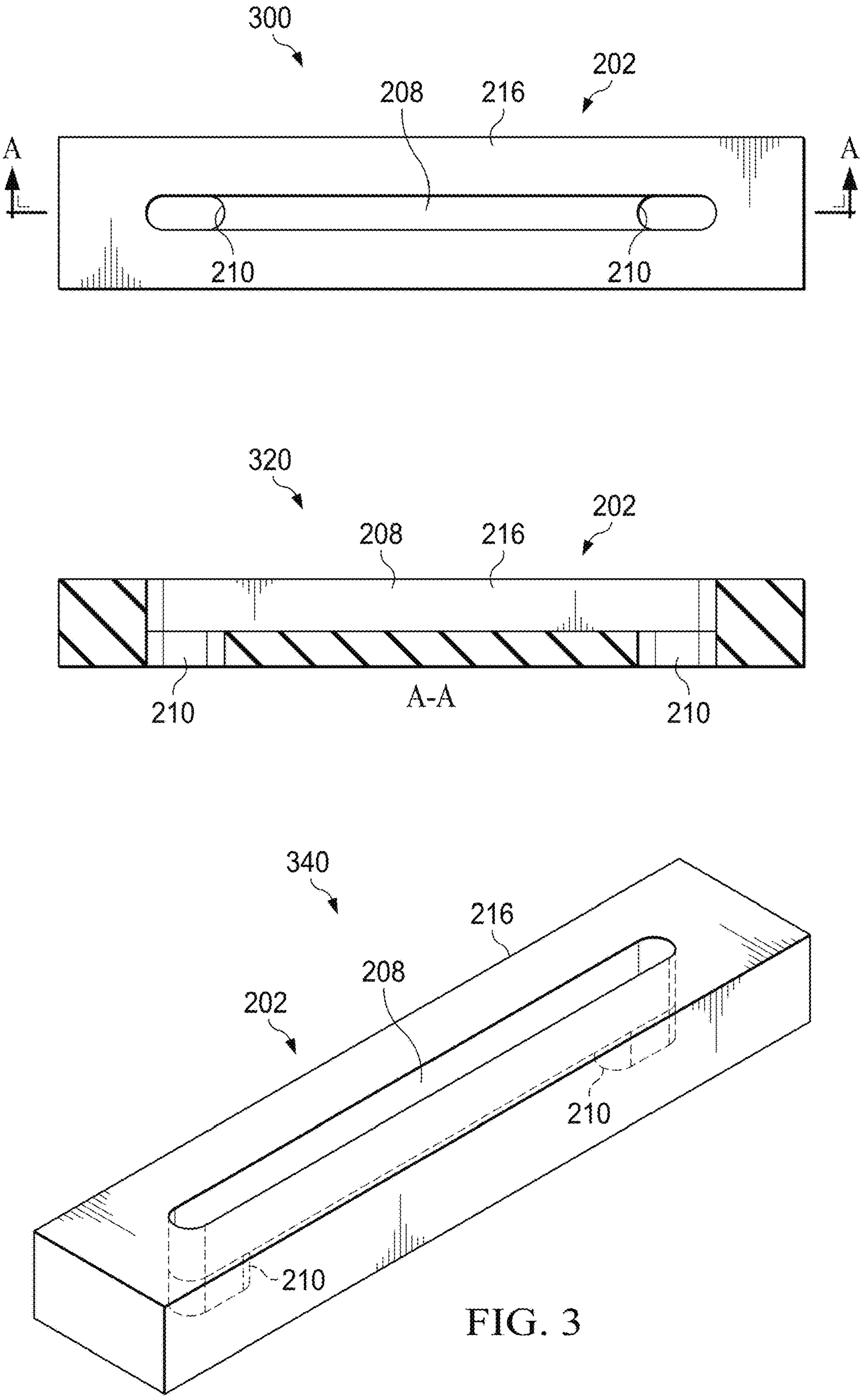
FIG. 3 shows various views of the substrate of FIG. 2, in accordance with various embodiments.
Figure 4:
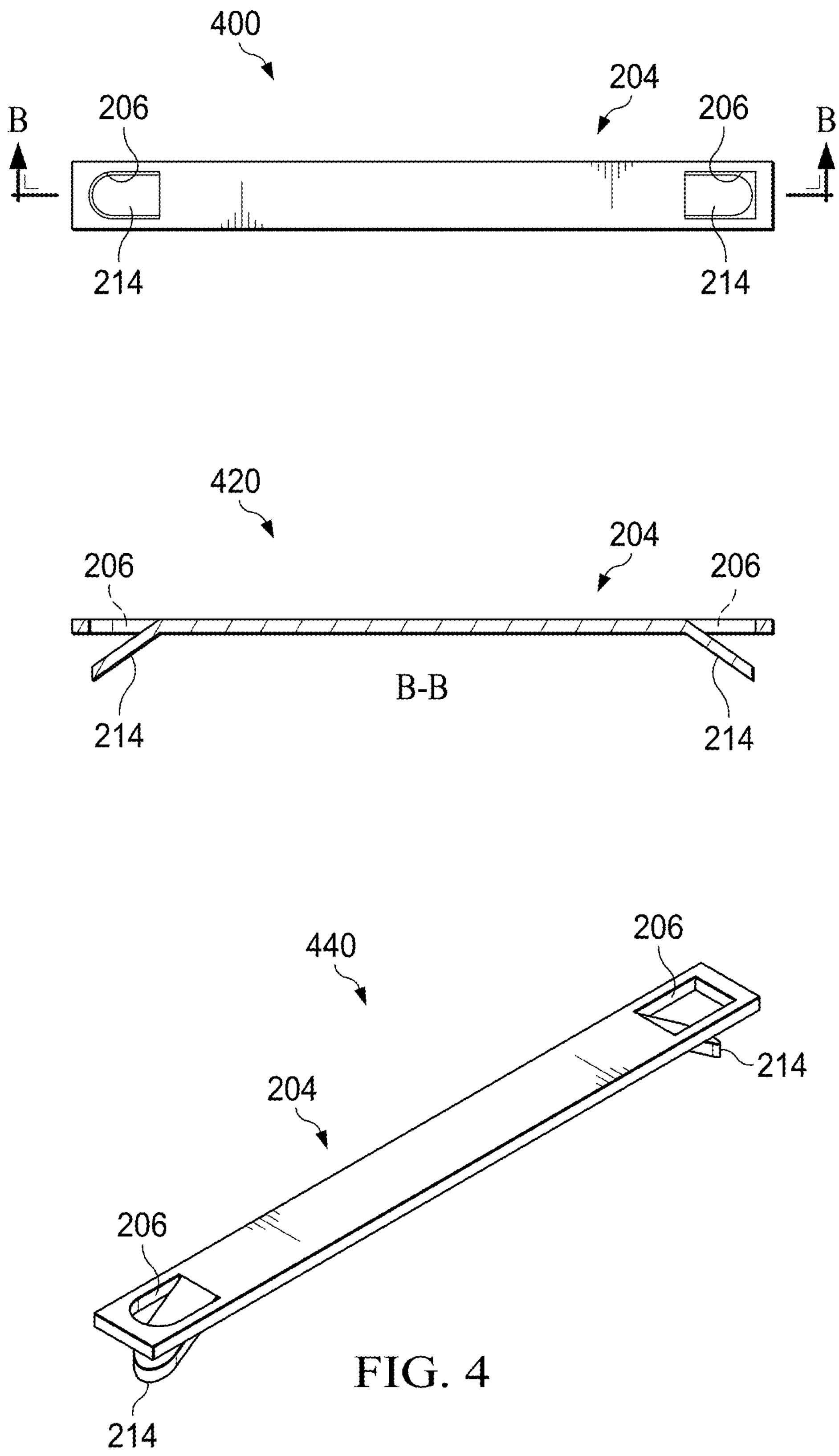
FIG. 4 shows various views of the antenna structure of FIG. 2, in accordance with various embodiments.

FIGS. 2, 3, and 4 show views of an antenna assembly 201, a PCB 202 of the antenna assembly 201, and an antenna structure 204 of the antenna assembly 201, respectively, and are described concurrently, where FIG. 2 shows an illustrative cross-sectional view 200 of an antenna assembly 201 including the PCB 202 and the antenna structure 204 with partial transparency, FIG. 3 shows a top-down view 300, a cross-sectional side view 320, and a perspective view 340 (with partial transparency) of the PCB 202, and FIG. 4 shows a top-down view 400, a cross-sectional side view 420 (with partial transparency), and a perspective view 440 (with partial transparency) of the antenna structure 204.

The antenna assembly 201 may correspond to an example embodiment of the antenna assembly 101 of FIG. 1, as a non-limiting example. The antenna assembly 201 may include the PCB 202 and the antenna structure 204 that is attached to the PCB 202. As shown, the PCB 202 includes dielectric material 212 and a metallized cavity formed in the dielectric material 212, which forms a waveguide 208 (e.g., an example embodiment of the waveguide 108 of FIG. 1). As shown, the antenna structure 204 is attached to the PCB 202 using tabs 214 (sometimes referred to as "press fit structures 214") that extend into the cavity of the waveguide 208.

In one or more embodiments, the antenna structure 204 includes antenna elements 206 and the tabs 214. The antenna structure 204 may be formed from a single, contiguous piece of electrically conductive material (e.g., metal or metallized plastic). In one or more embodiments, the antenna elements 206 may be formed as slot antennas (e.g., openings) in the electrically conductive material of the antenna structure 204. In one or more embodiments, the antenna structure 204 may be formed from one or a combination of aluminum, copper, steel, or another suitable electrically conductive material. The antenna structure 204 may be formed as stamped metal, laser-cut metal, or three-dimensional (3D) printed metal, as non-limiting examples. The tabs 214 may be protrusions of the antenna structure 204 that extend below a plane of a lower surface of the antenna structure 204. In one or more embodiments, each of the tabs 214 may extend away from the antenna structure 204 at an angle that is at or around 45 degrees offset from the plane of the lower surface of the antenna structure 204. The tabs 214 may mechanically attach or otherwise secure the antenna structure 204 to the PCB 202 through contact with side walls of the metallized cavity of the waveguide 208 (e.g., contact with a portion of the conductive layer 216 that forms the side walls of the metallized cavity of the waveguide 208).

The waveguide 208 may be a metallized cavity, where surfaces of the PCB 202 defining the cavity are coated in an electrically conductive layer 216 that is formed in one or more layers of dielectric material 212 of the PCB 202. In one or more embodiments, the electrically conductive layer 216 may extend onto the upper surface of the PCB 202 (e.g., an upper surface of the dielectric material 212). In one or more embodiments, the electrically conductive layer 216 may include metal (e.g., copper as a non-limiting example).

In one or more embodiments, the waveguide 208 may extend completely through the PCB 202 (e.g., extending from a top side or upper surface of the PCB 202 to a bottom side or lower surface of the PCB 202). In one or more embodiments, the waveguide 208 may be laterally surrounded by the dielectric material 212. In one or more embodiments, a portion of the dielectric material 212 may be interposed between a portion of the waveguide 208 and a bottom surface of the PCB 202. The waveguide 208 may include waveguide interfaces 210 (e.g., through which RF signals may be passed to and from the antenna elements 206).

In one or more embodiments, the waveguide interfaces 210 may extend deeper into the PCB 202 than other regions (e.g., non-interface regions) of the waveguide 208, for example. In one or more embodiments, the waveguide interfaces 210 correspond to regions of the waveguide 208 that may extend to a bottom surface (e.g., a lower surface, opposite the upper surface at which the antenna structure 204 is disposed) of the PCB 202. In one or more embodiments, non-interface regions of the waveguide 208 may be formed (e.g., as a metallized cavity) in a first layer of the PCB 202 and the waveguide interfaces 210 may be formed (e.g., as metallized cavities) in a second layer of the PCB 202 (e.g., where the second layer is disposed below the first layer, if considering the antenna structure 204 as being disposed above the PCB 202). In one or more other embodiments, both the non-interface regions of the waveguide 208 and the interfaces 210 may be formed (e.g., as a metallized cavity) in a single layer of the PCB 202. In one or more embodiments, the PCB 202 may have a height (e.g., the distance between the upper and lower surfaces of the PCB 202) of around 3.2 mm. In one or more embodiments, the waveguide interfaces 210 may have a height of around 0.65 mm and the non-interface regions of the waveguide 208 may have a height of around 2.55 mm (e.g., extending from the top of the waveguide interfaces 210 to the upper surface of the PCB 202).

While the waveguide 208 is formed as a metallized cavity in a PCB in the present example, this is intended to be illustrative and non-limiting. For example, in one or more other embodiments, the waveguide 208 may instead be formed as a metallized cavity in a suitable metallized dielectric substrate other than a PCB, such as a 3D printed substrate, an in-mold electronics (IME) substrate, or a Molded Interconnect Device (MID) substrate, as non-limiting examples.

As shown the present example, each of the antenna elements 206 may vertically overlap (e.g., along an axis normal to an upper surface of the antenna structure 204) a corresponding waveguide interface 210.

In one or more embodiments, the antenna structure 204 may be mounted on or otherwise attached to the PCB 202, such that the antenna structure 204 is secured in place over and in contact with the PCB 202 (e.g., overlapping and completely or substantially covering the cavity corresponding to the waveguide 208). In one or more embodiments, the antenna structure 204 may be attached to the PCB 202 using one or more press fit structures (e.g., the tabs 214, press fit pins, or a combination of these) dimensioned to lock or otherwise secure the antenna structure 204 over and in contact with the PCB 202. In one or more other embodiments, the antenna structure 204 may additionally or alternatively be attached to the PCB 202 using solder, solder paste, adhesive (e.g., conductive or non-conductive adhesive, such as conductive or non-conductive glue), fasteners (e.g., metal fasteners such as screws), or any suitable combination thereof, as non-limiting examples.

Figure 5:
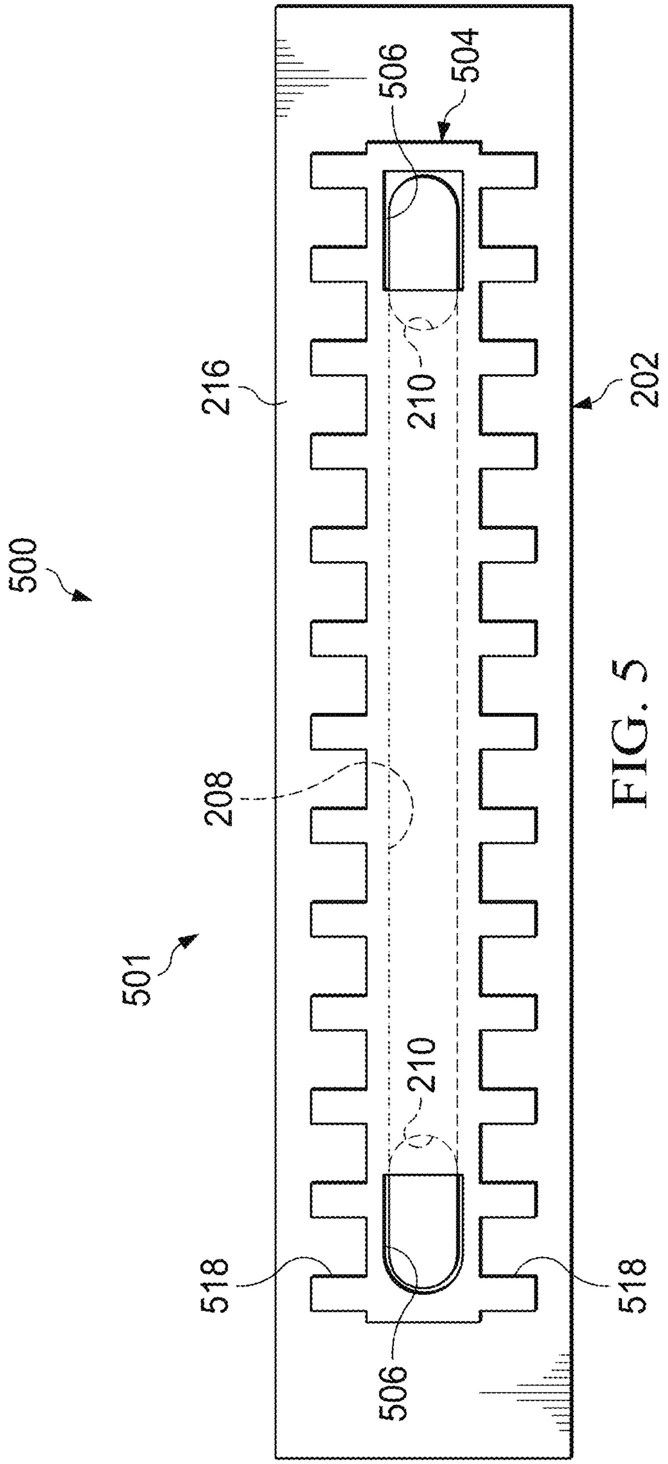
FIG. 5 shows a top-down view of an illustrative antenna assembly having a substrate in which a waveguide is formed from a metallized cavity and having a separate antenna structure attached to the substrate, where the antenna structure includes legs disposed at opposite sides of the antenna structure, in accordance with various embodiments.
Figure 6:
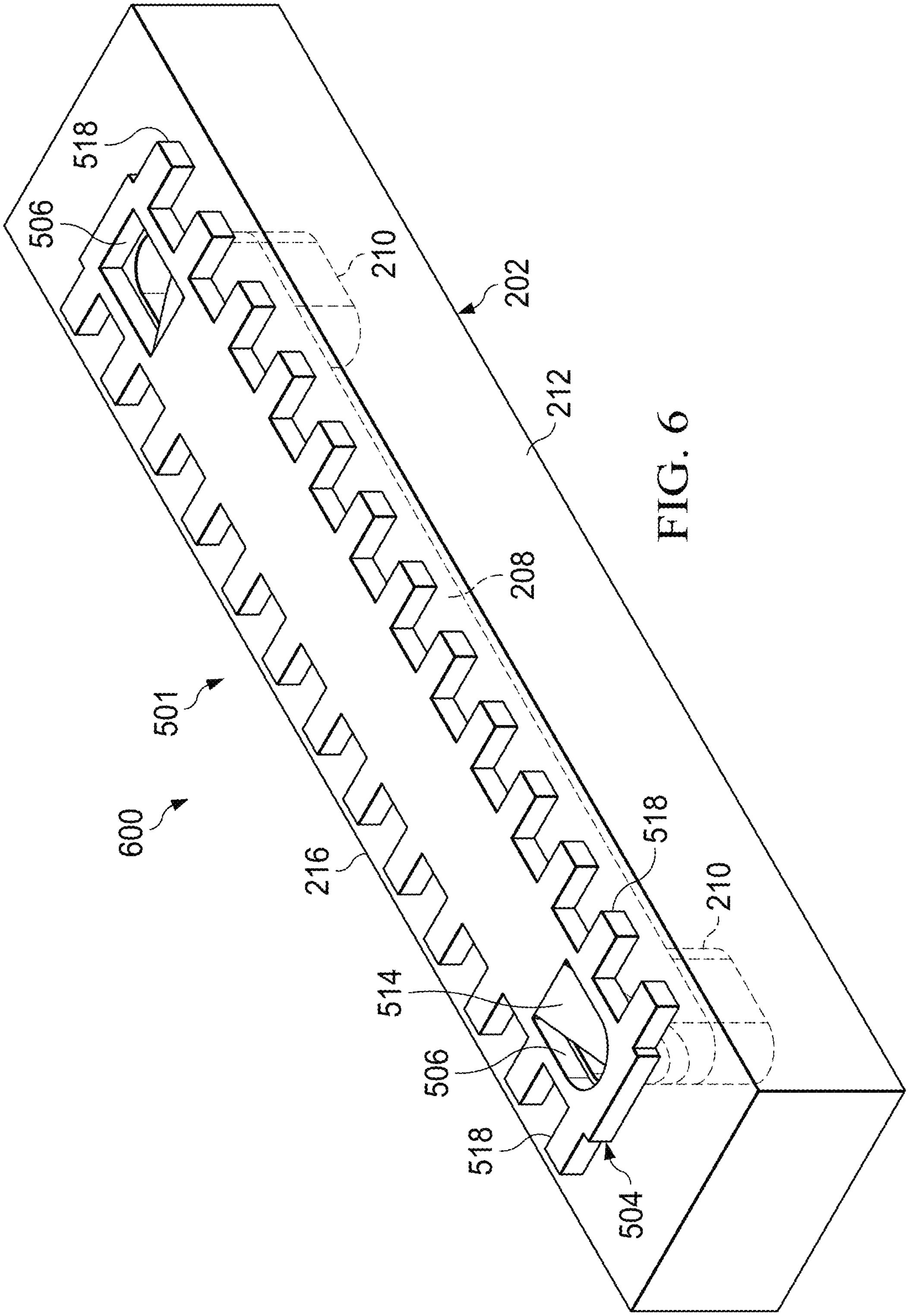
FIG. 6 shows a perspective view of the antenna assembly of FIG. 5, in accordance with various embodiments.

FIGS. 5 and 6 show respective views of an antenna assembly 501 and are described concurrently, where FIG. 5 shows an illustrative top-down view 500 of the antenna assembly 501 with partial transparency, and FIG. 6 shows a perspective view 600 of the antenna assembly 501 with partial transparency. As shown in FIGS. 5 and 6, the antenna assembly 501 includes an antenna structure 504 and a PCB substrate, where the antenna structure 504 is attached to the PCB substrate. Various aspects of the PCB substrate of the antenna assembly 501 may correspond to aspects of the PCB 202 of FIGS. 2 and 3, with like reference numerals denoting like elements. Detailed descriptions of such elements of the antenna assembly 501 that have already been provided above in connection with FIGS. 2 and 3 are not necessarily repeated here for sake of brevity.

As shown, the antenna structure 504 is attached to the PCB 202 using tabs 514 (sometimes referred to as "press fit structures 514") that extend into the cavity of the waveguide 208. In one or more embodiments, the antenna structure 504 includes antenna elements 506 and the tabs 514. The antenna structure 504 may be formed from a single, contiguous piece of electrically conductive material (e.g., metal or metallized plastic). In one or more embodiments, the antenna elements 506 may be formed as slot antennas (e.g., openings) in the electrically conductive material of the antenna structure 504. In one or more embodiments, the antenna structure 504 may be formed from one or a combination of aluminum, copper, steel, or another suitable electrically conductive material. The antenna structure 504 may be formed as stamped metal, laser-cut metal, or three-dimensional (3D) printed metal, as non-limiting examples. The tabs 514 may be protrusions of the antenna structure 504 that extend below a plane of a lower surface of the antenna structure 504. In one or more embodiments, each of the tabs 514 may extend away from the antenna structure 504 at an angle that is at or around 45 degrees offset from the plane of the lower surface of the antenna structure 504. The tabs 514 may mechanically attach or otherwise secure the antenna structure 504 to the PCB 202 through contact with side walls of the metallized cavity of the waveguide 208 (e.g., contact with a portion of the conductive layer 216 that forms the side walls of the metallized cavity of the waveguide 208).

The antenna structure 504 may include legs 518, where a first group of legs of the legs 518 are disposed at and protrude from a first side of the antenna structure 504 and a second group of legs of the legs 518 are disposed at and protrude from a second side of the antenna structure 504. The first side of the antenna structure 504 may be disposed opposite to the second side of the antenna structure 504, such that the legs 518 may be disposed on two opposite sides of the antenna structure 504. The legs 518 may each be integrally formed with a central body portion of the antenna structure 504. In one or more embodiments, each of the legs 518 is a protrusion having a rectangular or substantially rectangular cross-section. In one or more embodiments, each of the legs 518 has the shape of a rectangular prism (e.g., with one face of the rectangular prism being joined to the central body portion of the antenna structure 504). In one or more embodiments, the pitch of the legs 518 (e.g., the center distance between adjacent pins of the legs 518) may be between 0.8 mm and 1.2 mm. In one or more embodiments, the pitch of the legs 518 may be at or around 1 mm.

In one or more embodiments, the antenna structure 504 may be mounted on or otherwise attached to the PCB 202, such that the antenna structure 504 is secured in place over and in contact with the PCB 202 (e.g., overlapping and completely or substantially covering the cavity corresponding to the waveguide 208). In one or more embodiments, the antenna structure 504 may be attached to the PCB 202 using one or more press fit structures (e.g., the tabs 214) dimensioned to lock or otherwise secure the antenna structure 504 over and in contact with the PCB 202. In one or more other embodiments, the antenna structure 504 may additionally or alternatively be attached to the PCB 202 using solder, solder paste, adhesive (e.g., conductive or non-conductive adhesive, such as conductive or non-conductive glue), fasteners (e.g., metal fasteners such as screws), or any suitable combination thereof, as non-limiting examples. In one or more embodiments, solder, solder paste, adhesive (e.g., conductive or non-conductive adhesive, such as conductive or non-conductive glue), or a combination of these may attach each leg of the legs 518 to the upper surface of the PCB 202 (e.g., to the conductive layer 216). Attaching the legs 518 to the PCB 202 in this way, may provide improved ground referencing and shielding.

Figure 7:
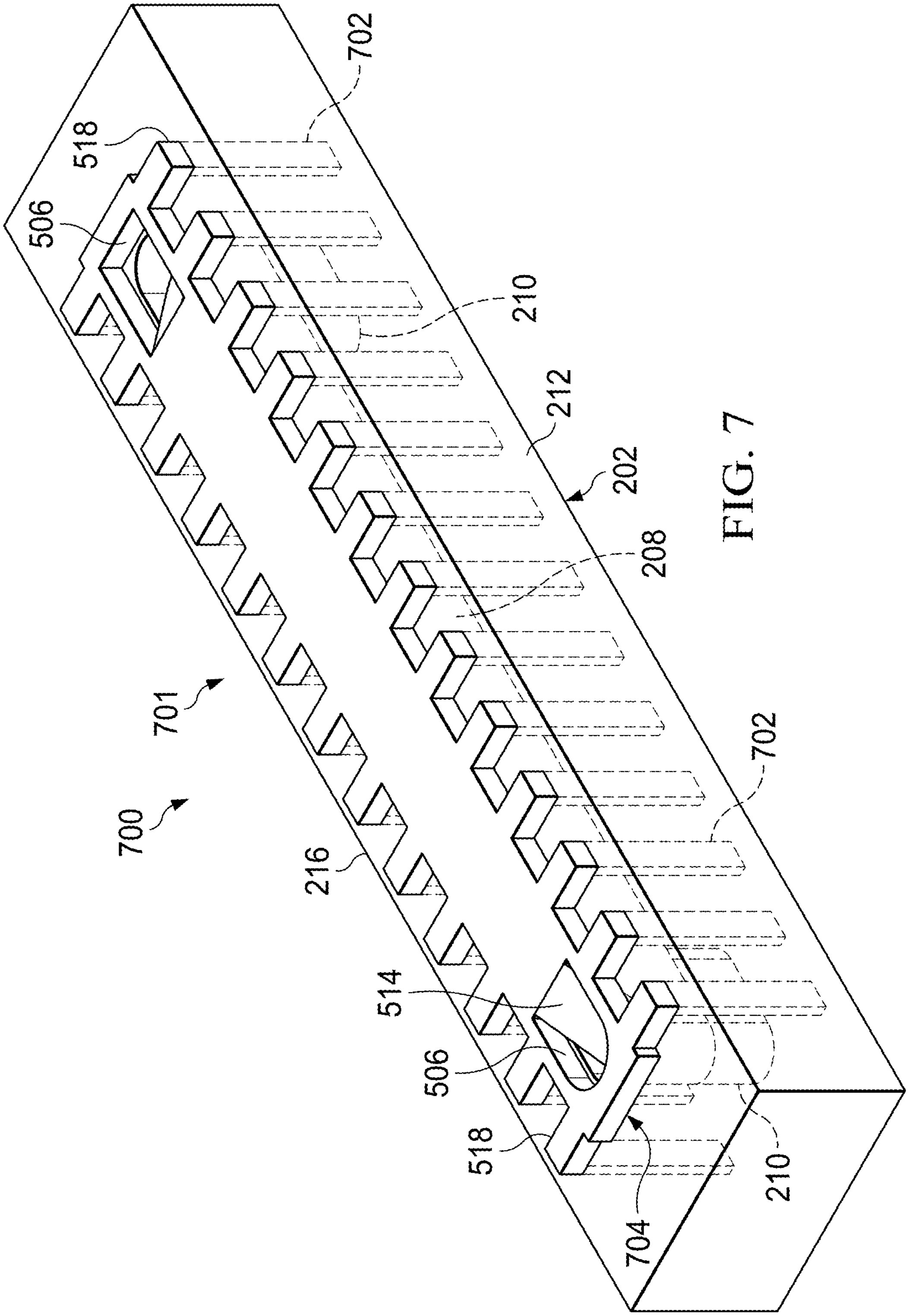
FIG. 7 shows a perspective view of an illustrative antenna assembly having a substrate in which a waveguide is formed from a metallized cavity and having a separate antenna structure attached to the substrate, where the antenna structure includes legs disposed at opposite sides of the antenna structure, and where pins extend from the legs into the substrate, in accordance with various embodiments.

FIG. 7 shows an illustrative perspective view 700 of an antenna assembly 701 with partial transparency. Various aspects of the antenna assembly 701 may correspond to aspects of the PCB 202 of FIGS. 2 and 3 and the antenna assembly 501 of FIGS. 5 and 6, with like reference numerals denoting like elements. Detailed descriptions of such elements of the antenna assembly 701 that have already been provided above in connection with FIGS. 2, 3, 5, and 6 are not necessarily repeated here for sake of brevity.

In the present example, antenna assembly 701 includes an antenna structure 704, which includes pins 702 that extend into the PCB 202 (e.g., through the conductive layer 216 and partly through the dielectric material 212). The pins 702 may be integrally formed with the antenna structure 504. The pins 702 may extend (e.g., protrude) from the legs 518 in a direction that is normal or substantially normal (e.g., within +/−5%) to the plane of the lower surface of the antenna structure 504. The pins 702 may mechanically attach the antenna structure 504 to the PCB 202.

In one or more embodiments, the pins 702 may be press fit structures, and openings in the PCB 202 into which the pins 702 are inserted into press fit terminals of the PCB 202 that are dimensioned to receive the pins 702, where the pins 702 are secured (e.g., locked) in place when inserted into the press fit terminals. In one or more embodiments, further attachment of the antenna structure 504 to the PCB 202 may be achieved through solder, glue, mechanical fasteners (e.g., screws), or a combination thereof, as non-limiting examples, in addition to the mechanical attachment provided by the pins 702. In one or more embodiments, the pitch of the pins 702 (e.g., the center distance between adjacent pins of the pins 702) may be equal to the pitch of the legs 518.

Figure 8:
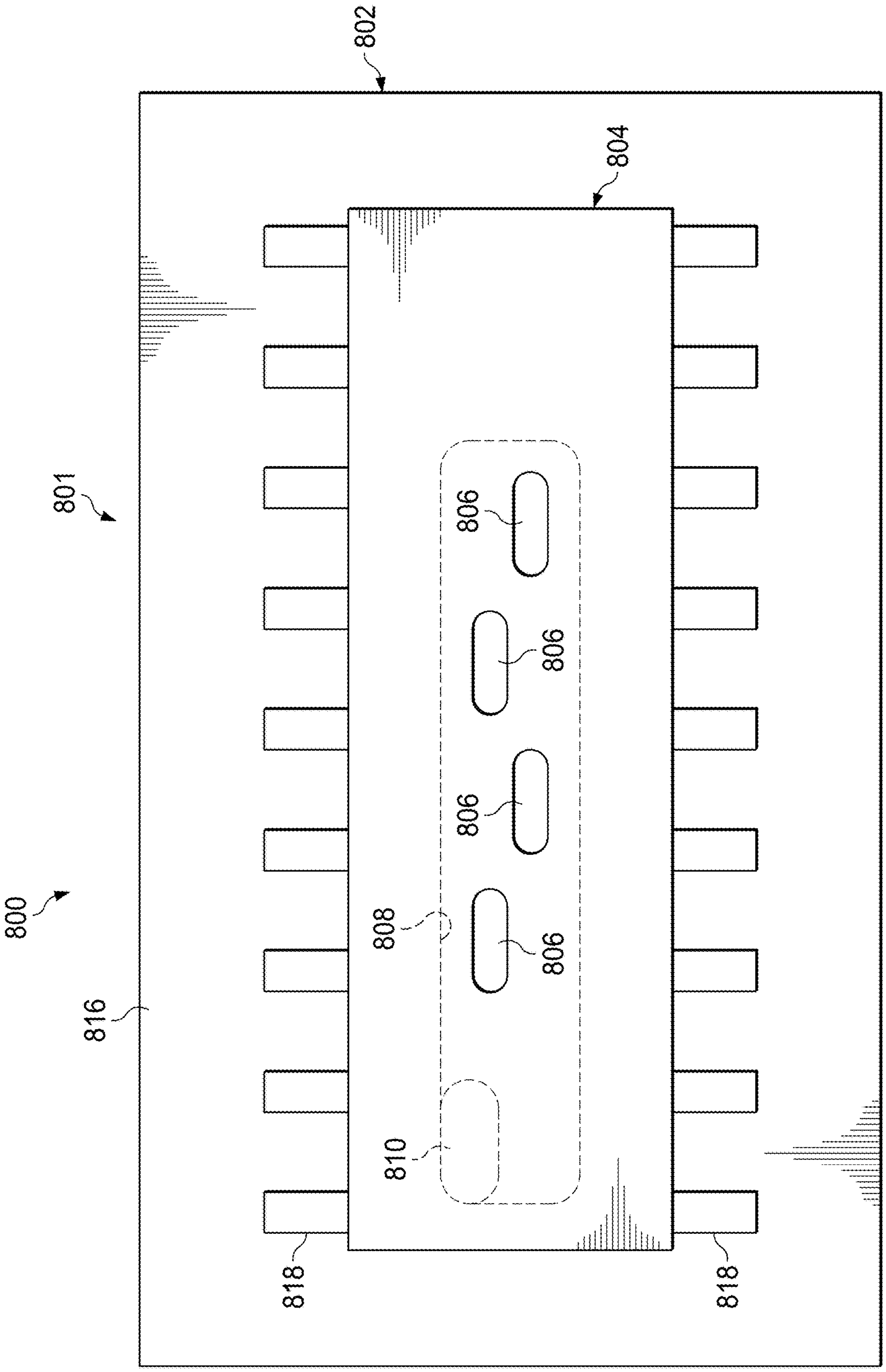
FIG. 8 shows a top-down view of an illustrative antenna assembly having a substrate in which a waveguide is formed from a metallized cavity and having a separate antenna structure attached to the substrate, where the antenna structure includes legs disposed at opposite sides of the antenna structure, and where antenna elements formed in the antenna structure are laterally offset from a waveguide interface of the waveguide, in accordance with various embodiments.
Figure 9:
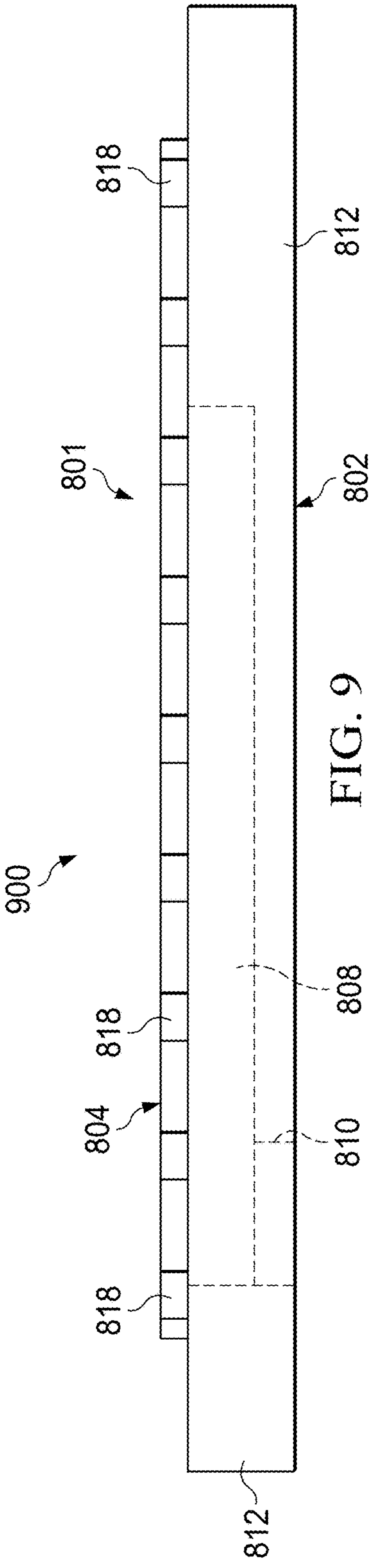
FIG. 9 shows a cross-sectional side view of the antenna assembly of FIG. 8, in accordance with various embodiments.
Figure 10:
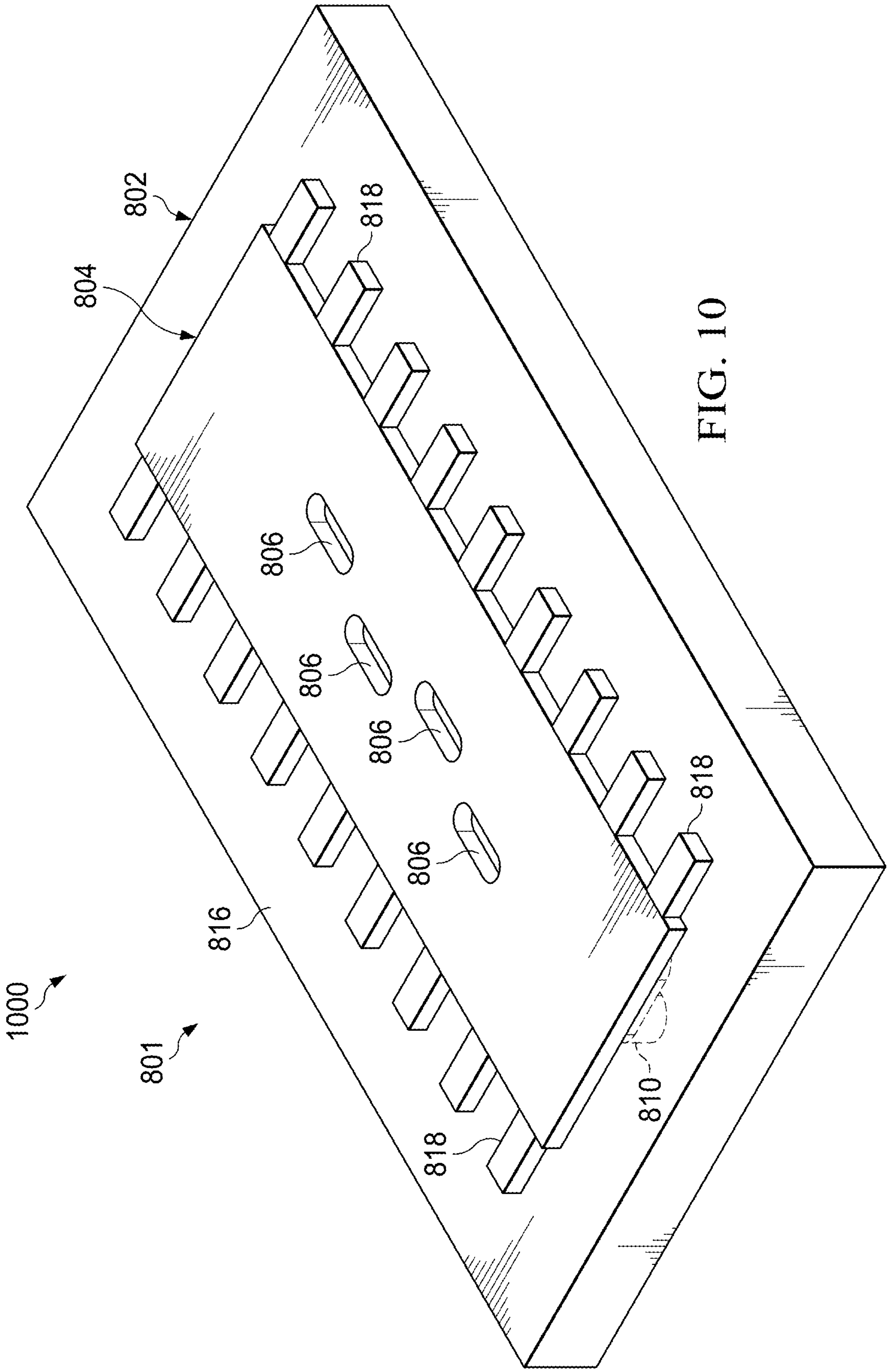
FIG. 10 shows a perspective view of the antenna assembly of FIG. 8, in accordance with various embodiments.
Figure 11:
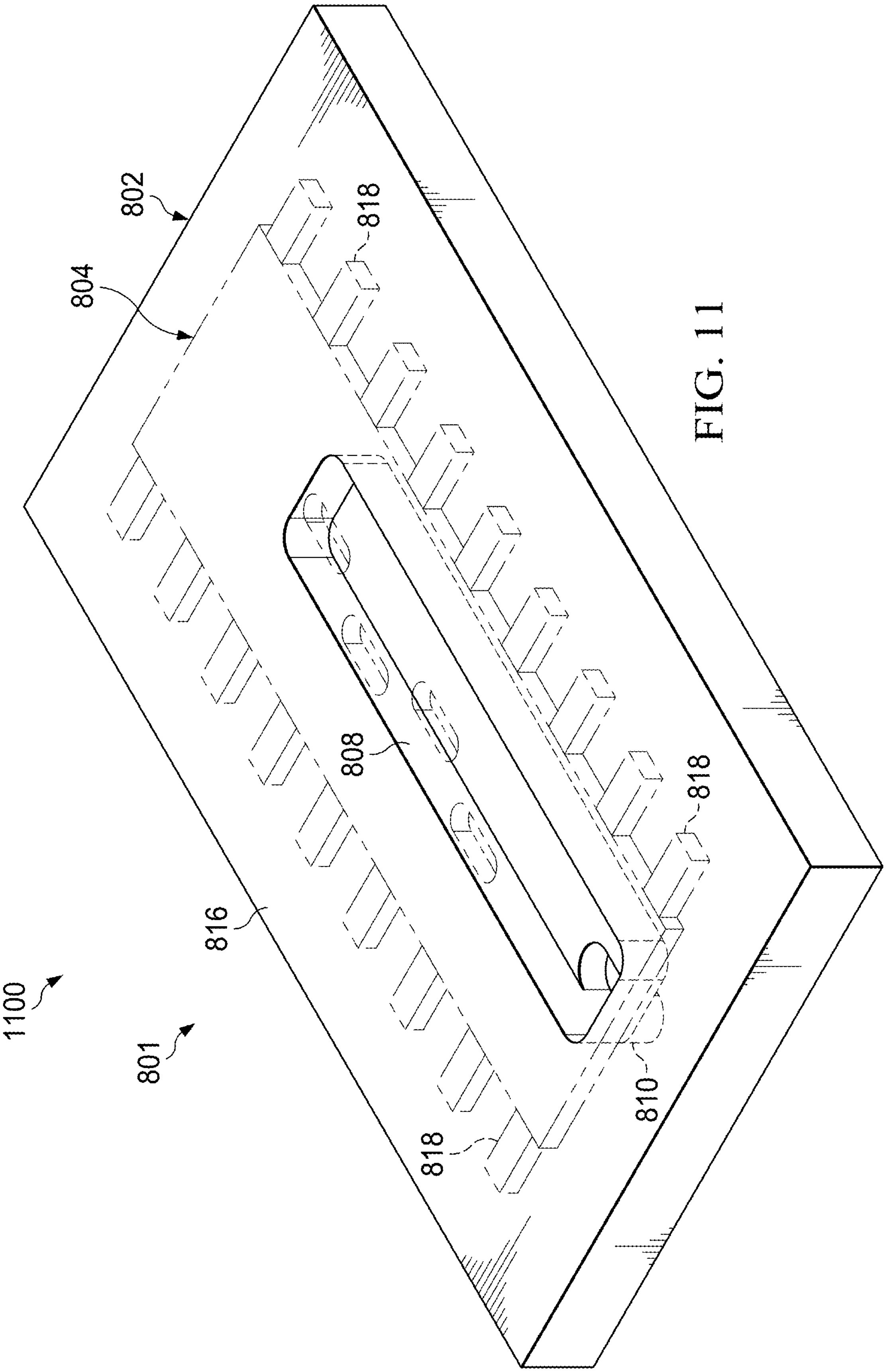
FIG. 11 shows a perspective view of the antenna assembly of FIG. 8 with partial transparency of the antenna structure, in accordance with various embodiments.

FIGS. 8-11 show various views of an antenna assembly 801 having a PCB 802 and an antenna structure 804, and are described concurrently, with FIG. 8 showing an illustrative top-down view 800 of the antenna assembly 801, FIG. 9 showing an illustrative side view 900 of the antenna assembly 801, FIG. 10 showing an illustrative perspective view 1000 of the antenna assembly 801 with partial transparency, and FIG. 11 shows an illustrative perspective view 1100 of the antenna assembly 801 in which the antenna structure 804 and the PCB 802 are shown with partial transparency.

As shown in FIGS. 8-11, the antenna assembly 801 may include the PCB 802 and the antenna structure 804 that is attached to the PCB 802. As shown, the PCB 802 includes dielectric material 812 and a metallized cavity formed in the dielectric material 812, which forms a waveguide 808 (e.g., an example embodiment of the waveguide 108 of FIG. 1 having a single waveguide interface and multiple slot antennas).

In one or more embodiments, the antenna structure 804 includes antenna elements 806. The antenna structure 804 may be formed from a single, contiguous piece of electrically conductive material (e.g., metal or metallized plastic). In one or more embodiments, the antenna elements 806 may be formed as slot antennas (e.g., openings) in the electrically conductive material of the antenna structure 804. In one or more embodiments, the antenna structure 804 may be formed from one or a combination of aluminum, copper, steel, or another suitable electrically conductive material. In the present example, four antenna elements 806 are formed in the antenna structure 804, though it should be understood that more or fewer than four antenna elements may be formed in the antenna structure 804 in accordance with various other embodiments. In one or more embodiments, the antenna elements 806 have a non-uniform arrangement, as shown. In one or more other embodiments, the antenna elements 806 have a uniform arrangement (e.g., the antennas elements 806 are arranged in a uniform grid). The antenna structure 804 may be formed as stamped metal, laser-cut metal, or three-dimensional (3D) printed metal, as non-limiting examples.

The waveguide 808 may be a metallized cavity, where surfaces of the PCB 802 defining the cavity are coated in an electrically conductive layer 216 that is formed in one or more layers of dielectric material 812 of the PCB 802. In one or more embodiments, the electrically conductive layer 816 may extend onto the upper surface of the PCB 802 (e.g., an upper surface of the dielectric material 812). In one or more embodiments, the electrically conductive layer 816 may include metal (e.g., copper as a non-limiting example).

In one or more embodiments, the waveguide 808 may extend completely through the PCB 802 (e.g., extending from a top side or upper surface of the PCB 802 to a bottom side or lower surface of the PCB 802). In one or more embodiments, the waveguide 808 may be laterally surrounded by the dielectric material 812. In one or more embodiments, a portion of the dielectric material 812 may be interposed between a portion of the waveguide 808 and a bottom surface of the PCB 802. The waveguide 808 may include a single waveguide interface 810 (e.g., through which RF signals may be passed to and from the antenna elements 806).

In one or more embodiments, the waveguide interface 810 may extend deeper into the PCB 802 than other regions (e.g., non-interface regions) of the waveguide 808, for example. In one or more embodiments, the waveguide interface 810 corresponds to a region of the waveguide 808 that may extend to a bottom surface (e.g., a lower surface, opposite the upper surface at which the antenna structure 804 is disposed) of the PCB 802. In one or more embodiments, non-interface regions of the waveguide 808 may be formed (e.g., as a metallized cavity) in a first layer of the PCB 802 and the waveguide interface 810 may be formed (e.g., as a metallized cavity, which may be an extension of the metallized cavity in which the non-interface regions of thew waveguide 808 are formed) in a second layer of the PCB 802 (e.g., where the second layer is disposed below the first layer, if considering the antenna structure 804 as being disposed above the PCB 802). In one or more other embodiments, both the non-interface regions of the waveguide 808 and the interface 810 may be formed (e.g., as a metallized cavity) in a single layer of the PCB 802. In one or more embodiments, the PCB 802 may have a height (e.g., the distance between the upper and lower surfaces of the PCB 802) of around 2 mm. In one or more embodiments, the waveguide interface 810 may have a height of around 0.8 mm and the non-interface regions of the waveguide 808 may have a height of around 1.2 mm (e.g., extending from the top of the waveguide interface 810 to the upper surface of the PCB 802).

While the waveguide 808 is formed as a metallized cavity in a PCB in the present example, this is intended to be illustrative and non-limiting. For example, in one or more other embodiments, the waveguide 808 may instead be formed as a metallized cavity in a suitable metallized dielectric substrate other than a PCB, such as a 3D printed substrate, an in-mold electronics (IME) substrate, or a Molded Interconnect Device (MID) substrate, as non-limiting examples.

As shown the present example, each of the antenna elements 806 may be laterally offset from (e.g., not vertically overlapping along an axis normal to an upper surface of the antenna structure 804) a corresponding waveguide interface 810.

The antenna structure 804 may include legs 818, where a first group of legs of the legs 818 are disposed at and protrude from a first side of the antenna structure 804 and a second group of legs of the legs 818 are disposed at and protrude from a second side of the antenna structure 804. The first side of the antenna structure 804 may be disposed opposite to the second side of the antenna structure 804, such that the legs 818 may be disposed on two opposite sides of the antenna structure 804. The legs 818 may each be integrally formed with a central body portion of the antenna structure 804. In one or more embodiments, each of the legs 818 is a protrusion having a rectangular or substantially rectangular cross-section. In one or more embodiments, each of the legs 818 has the shape of a rectangular prism (e.g., with one face of the rectangular prism being joined to the central body portion of the antenna structure 804). In one or more embodiments, the pitch of the legs 818 (e.g., the center distance between adjacent pins of the legs 818) may be between 0.8 mm and 1.2 mm. In one or more embodiments, the pitch of the legs 818 may be at or around 1 mm.

In one or more embodiments, the antenna structure 804 may be mounted on or otherwise attached to the PCB 802, such that the antenna structure 804 is secured in place over and in contact with the PCB 802 (e.g., overlapping and completely or substantially covering the cavity corresponding to the waveguide 808). In one or more embodiments, the antenna structure 804 may be attached to the PCB 802 using one or more press fit structures (e.g., tabs, press fit pins, or a combination of these) dimensioned to lock or otherwise secure the antenna structure 804 over and in contact with the PCB 802. In one or more other embodiments, the antenna structure 804 may additionally or alternatively be attached to the PCB 802 using solder, solder paste, adhesive (e.g., conductive or non-conductive adhesive, such as conductive or non-conductive glue), fasteners (e.g., metal fasteners such as screws), or any suitable combination thereof, as nonlimiting examples. In one or more embodiments, solder, solder paste, adhesive (e.g., conductive or non-conductive adhesive, such as conductive or non-conductive glue), or a combination of these may attach each leg of the legs 818 to the upper surface of the PCB 802 (e.g., to the conductive layer 816).

Various exemplary embodiments are presented below. Some simplifications and omissions may be made in the following examples, which are intended to highlight and introduce some aspects of the various exemplary embodiments, without limiting the scope.

In an example embodiment, an antenna assembly includes an antenna structure formed from a single contiguous piece of metal, the antenna structure including at least one slot antenna formed in the single contiguous piece of metal, and a substrate including at least one dielectric layer, and a waveguide including a metallized cavity that extends through the at least one dielectric layer. The antenna structure may be attached to the substrate, may be disposed at an upper surface of the substrate, and may cover the metallized cavity of the waveguide.

In one or more embodiments, the substrate includes a printed circuit board substrate, an in-mold electronics (IME) substrate, or a molded interconnect device (MID) substrate.

In one or more embodiments, the waveguide includes at least one waveguide interface disposed at a lower surface of the substrate and corresponds to at least one opening in the lower surface of the substrate.

In one or more embodiments, the metallized cavity of the waveguide is disposed entirely in a single dielectric layer of the substrate.

In one or more embodiments, a first portion of the metallized cavity that is separate from the at least one waveguide interface extends through a first dielectric layer of the substrate, and a second portion of the metallized cavity that includes the at least one waveguide interface extends through only a second dielectric layer of the substrate.

In one or more embodiments, the at least one slot antenna includes a first slot antenna, the at least one waveguide interface includes a first waveguide interface, and the first slot antenna is disposed over and vertically overlapping the first waveguide interface.

In one or more embodiments, the at least one slot antenna further includes a second slot antenna, the at least one waveguide interface further includes a second waveguide interface, and the second slot antenna is disposed over and vertically overlapping the second waveguide interface.

In one or more embodiments, the at least one waveguide interface is laterally offset from the at least one slot antenna.

In one or more embodiments, the at least one slot antenna includes a first slot antenna and a second slot antenna, and the antenna structure further includes a first tab that extends from the first slot antenna into the metallized cavity of the waveguide a second tab that extends from the second slot antenna into the metallized cavity of the waveguide. The first tab and the second tab may be integrally formed with the single contiguous piece of metal of the antenna structure, and the first tab and the second tab may provide mechanical attachment between the antenna structure and the substrate.

In one or more embodiments, the antenna structure includes a plurality of legs protruding from a first side of the antenna structure and a second side of the antenna structure, the plurality of legs are integrally formed with the single contiguous piece of metal of the antenna structure, and the plurality of legs are attached to the upper surface of the substrate using one or more of solder, solder paste, adhesive, or press fit structures.

In one or more embodiments, the plurality of legs of the antenna structure has a pitch of between 0.8 mm and 1.2 mm.

In an example embodiment, a system includes transceiver circuitry configured to send and receive radio frequency signals and an antenna assembly coupled to the transceiver circuitry. The antenna assembly includes an antenna structure formed from a single contiguous piece of metal and including at least one slot antenna formed in the single contiguous piece of metal and includes a printed circuit board substrate including at least one dielectric layer and a waveguide including a metallized cavity that extends through the at least one dielectric layer. The antenna structure may be attached to the printed circuit board substrate and is disposed at an upper surface of the printed circuit board substrate, and may cover the metallized cavity of the waveguide.

In one or more embodiments, the waveguide includes at least one waveguide interface disposed at a lower surface of the printed circuit board substrate and corresponds to at least one opening in the lower surface of the printed circuit board substrate.

In one or more embodiments, the metallized cavity of the waveguide is disposed entirely in a single dielectric layer of the printed circuit board substrate.

In one or more embodiments, a first portion of the metallized cavity that is separate from the at least one waveguide interface extends through a first dielectric layer of the printed circuit board substrate, and a second portion of the metallized cavity that includes the at least one waveguide interface extends through only a second dielectric layer of the printed circuit board substrate.

In one or more embodiments, the at least one slot antenna includes a first slot antenna, the at least one waveguide interface includes a first waveguide interface, and the first slot antenna is disposed over and vertically overlapping the first waveguide interface.

In one or more embodiments, the at least one slot antenna further includes a second slot antenna, the at least one waveguide interface further includes a second waveguide interface, and the second slot antenna is disposed over and vertically overlapping the second waveguide interface.

In one or more embodiments, the at least one waveguide interface is laterally offset from the at least one slot antenna.

In one or more embodiments, the at least one slot antenna includes a first slot antenna and a second slot antenna, and the antenna structure further includes a first tab that extends from the first slot antenna into the metallized cavity of the waveguide, and a second tab that extends from the second slot antenna into the metallized cavity of the waveguide. The first tab and the second tab may be integrally formed with the single contiguous piece of metal of the antenna structure, and the first tab and the second tab may provide mechanical attachment between the antenna structure and the printed circuit board substrate.

In one or more embodiments, the antenna structure includes a plurality of legs protruding from a first side of the antenna structure and a second side of the antenna structure, the plurality of legs are integrally formed with the single contiguous piece of metal of the antenna structure, and the plurality of legs are attached to the upper surface of the printed circuit board substrate using one or more of solder, solder paste, adhesive, or press fit structures.

Although the operations of the method(s) herein are shown and described in a particular order, the order of the operations of each method may be altered so that certain operations may be performed in an inverse order or so that certain operations may be performed, at least in part, concurrently with other operations. In one or more other embodiments, instructions or sub-operations of distinct operations may be implemented in an intermittent and/or alternating manner.

It should also be noted that at least some of the operations for the method(s) described herein may be implemented using software instructions stored on a computer useable storage medium for execution by a computer. As an example, an embodiment of a computer program product includes a computer useable storage medium to store a computer readable program. The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random-access memory (RAM), a read-only memory (ROM), a rigid magnetic disk, and an optical disk.

Alternatively, embodiments herein may be implemented entirely in hardware or in an implementation containing both hardware and software elements. In embodiments which use software, the software may include but is not limited to firmware, resident software, microcode, or other suitable software.

As used herein the terms "circuit" and "circuitry," including the term "processing circuitry" and related terminology means any suitable combination(s) of analog or digital circuit elements, hardware, firmware, software, and the like; including but not limited to, application-specific integrated circuits (ASICs), field programmable gate arrays (FPGAs), microcontrollers, and microprocessors. It will be understood that the term "circuitry" encompasses nonvolatile and volatile memory devices including, but not limited to random access memory (RAM), read-only memory (ROM), and the like, which can be implemented using any suitable devices, such as SRAM, DRAM, or magnetic storage devices as non-limiting examples. Along these lines it will be understood that references to a "processor" or "processing circuitry" can include devices in which general purpose computing devices includes or is otherwise coupled to memory which stores machine-readable instructions configured to cause the processing circuitry to perform the described actions. Such instructions can be stored as instructions in a high level programming language that is readable by human beings which are that are interpreted or compiled into object code or machine language, or they may be stored directly in a low-level language such as object code or machine language or another suitable representation, as nonlimiting examples.

It will be further understood that, unless explicitly stated otherwise, that features such as processing circuitry, memory, and related circuitry and devices can be implemented by any suitable combinations of one or more localized devices including, but not limiting to distributed systems formed by multiple distinct devices in communication with each other via direct electrical communication connections, wireless communication connections, and via public or private communication networks including the Internet. It will further be understood processing circuitry and related devices may be implemented by one or more physical machines or by virtual machines including, but not limited to, virtualized computing environments provided within a "cloud" computing environment or other virtualization systems.

While at least one exemplary embodiment has been presented in the foregoing detailed description, it should be appreciated that a vast number of variations exist. It should also be appreciated that exemplary embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. An antenna assembly comprising:

an antenna structure formed from a single contiguous piece of metal, the antenna structure comprising:

at least one slot antenna formed in the single contiguous piece of metal; and a substrate comprising:

at least one dielectric layer; and a waveguide comprising a metallized cavity that extends through the at least one dielectric layer, wherein the antenna structure is attached to the substrate, is disposed at an upper surface of the substrate, and covers the metallized cavity of the waveguide;

wherein the at least one slot antenna includes a first slot antenna and a second slot antenna, and the antenna structure further comprises:

a first tab that extends from the first slot antenna into the metallized cavity of the waveguide; and a second tab that extends from the second slot antenna into the metallized cavity of the waveguide, wherein the first tab and the second tab are integrally formed with the single contiguous piece of metal of the antenna structure, and the first tab and the second tab provide mechanical attachment between the antenna structure and the substrate.

2. The antenna assembly of claim 1, wherein the substrate is selected from a group consisting of: a printed circuit board substrate, an in-mold electronics (IME) substrate, and a molded interconnect device (MID) substrate.

3. The antenna assembly of claim 2, wherein the waveguide includes at least one waveguide interface disposed at a lower surface of the substrate and corresponds to at least one opening in the lower surface of the substrate.

4. The antenna assembly of claim 3, wherein the metallized cavity of the waveguide is disposed entirely in a single dielectric layer of the substrate.

5. The antenna assembly of claim 3, wherein a first portion of the metallized cavity that is separate from the at least one waveguide interface extends through a first dielectric layer of the substrate, and a second portion of the metallized cavity that includes the at least one waveguide interface extends through only a second dielectric layer of the substrate.

6. The antenna assembly of claim 3, wherein the at least one slot antenna includes a first slot antenna, the at least one waveguide interface includes a first waveguide interface, and the first slot antenna is disposed over and vertically overlapping the first waveguide interface.

7. The antenna assembly of claim 6, wherein the at least one slot antenna further includes a second slot antenna, the at least one waveguide interface further includes a second waveguide interface, and the second slot antenna is disposed over and vertically overlapping the second waveguide interface.

8. The antenna assembly of claim 3, wherein the at least one waveguide interface is laterally offset from the at least one slot antenna.

9. The antenna assembly of claim 1, wherein the antenna structure includes a plurality of legs protruding from a first side of the antenna structure and a second side of the antenna structure, the plurality of legs are integrally formed with the single contiguous piece of metal of the antenna structure, and the plurality of legs are attached to the upper surface of the substrate using one or more of solder, solder paste, adhesive, or press fit structures.

10. The antenna assembly of claim 9, wherein the plurality of legs of the antenna structure has a pitch of between 0.8 mm and 1.2 mm.

11. A system comprising:

transceiver circuitry configured to send and receive radio frequency signals; and an antenna assembly coupled to the transceiver circuitry, the antenna assembly comprising:

an antenna structure formed from a single contiguous piece of metal, the antenna structure comprising:

at least one slot antenna formed in the single contiguous piece of metal;

and a printed circuit board substrate comprising:

at least one dielectric layer; and a waveguide comprising a metallized cavity that extends through the at least one dielectric layer, wherein the antenna structure is attached to the printed circuit board substrate and is disposed at an upper surface of the printed circuit board substrate, and the antenna structure covers the metallized cavity of the waveguide;

wherein the antenna structure includes a plurality of legs protruding from a first side of the antenna structure and a second side of the antenna structure, the plurality of legs are integrally formed with the single contiguous piece of metal of the antenna structure, and the plurality of legs are attached to the upper surface of the printed circuit board substrate using one or more of solder, solder paste, adhesive, or press fit structures.

12. The system of claim 11, wherein the waveguide includes at least one waveguide interface disposed at a lower surface of the printed circuit board substrate and corresponds to at least one opening in the lower surface of the printed circuit board substrate.

13. The system of claim 12, wherein the metallized cavity of the waveguide is disposed entirely in a single dielectric layer of the printed circuit board substrate.

14. The system of claim 12, wherein a first portion of the metallized cavity that is separate from the at least one waveguide interface extends through a first dielectric layer of the printed circuit board substrate, and a second portion of the metallized cavity that includes the at least one waveguide interface extends through only a second dielectric layer of the printed circuit board substrate.

15. The system of claim 12, wherein the at least one slot antenna includes a first slot antenna, the at least one waveguide interface includes a first waveguide interface, and the first slot antenna is disposed over and vertically overlapping the first waveguide interface.

16. The system of claim 15, wherein the at least one slot antenna further includes a second slot antenna, the at least one waveguide interface further includes a second waveguide interface, and the second slot antenna is disposed over and vertically overlapping the second waveguide interface.

17. The system of claim 12, wherein the at least one waveguide interface is laterally offset from the at least one slot antenna.

18. The system of claim 11, wherein the at least one slot antenna includes a first slot antenna and a second slot antenna, and the antenna structure further comprises:

a first tab that extends from the first slot antenna into the metallized cavity of the waveguide; and a second tab that extends from the second slot antenna into the metallized cavity of the waveguide, wherein the first tab and the second tab are integrally formed with the single contiguous piece of metal of the antenna structure, and the first tab and the second tab provide mechanical attachment between the antenna structure and the printed circuit board substrate.

* * * * *